United States Patent
Amir

(10) Patent No.: US 7,619,532 B2
(45) Date of Patent: Nov. 17, 2009

(54) DUAL ANTENNA BASE STATION FOR IMPROVED RFID LOCALIZATION

(75) Inventor: Israel Amir, Princeton, NJ (US)

(73) Assignee: Remote Play, Inc.

( * ) Notice: Subject to any disclaimer, the term of this patent is extended or adjusted under 35 U.S.C. 154(b) by 341 days.

(21) Appl. No.: 11/881,618

(22) Filed: Jul. 27, 2007

(65) Prior Publication Data

US 2009/0027209 A1    Jan. 29, 2009

(51) Int. Cl.
*G08B 13/14* (2006.01)
(52) U.S. Cl. ............... 340/572.7; 340/10.1; 340/10.42
(58) Field of Classification Search .............. 340/572.7, 340/10.1, 10.42, 572.1, 572.5, 10.33, 10.52; 342/458, 450, 452
See application file for complete search history.

(56) References Cited

U.S. PATENT DOCUMENTS

| | | | | |
|---|---|---|---|---|
| 6,590,498 | B2 * | 7/2003 | Helms | 340/572.7 |
| 6,621,410 | B1 * | 9/2003 | Lastinger et al. | 340/10.42 |
| 7,061,428 | B1 | 6/2006 | Amir | |
| 2006/0181393 | A1 * | 8/2006 | Raphaeli | 340/10.1 |

* cited by examiner

*Primary Examiner*—Toan N Pham
(74) *Attorney, Agent, or Firm*—Henry Brendzel

(57) ABSTRACT

A base station that uses an antenna assembly and associated signal processing where the antenna assembly includes at least one directional antenna, developing information from which a determination is made regarding the direction from which a received signal is coming. By employing a plurality of such base stations the location of a transmitting tag is ascertained.

17 Claims, 2 Drawing Sheets

DUAL ANTENNA BASE STATION FOR IMPROVED RFID LOCALIZATION

BACKGROUND OF THE INVENTION

This relates to RFID systems and, more particularly, to systems that provide real time RFID tag location information.

One of the shortcomings of prior art RFID base stations is that they are not able to relatively precisely determine the locations of the RFID tags from which signals are received. One current-day approach for addressing this shortcoming is to employ a signal which the tag periodically transmits, in conjunction with a network of base stations receive the tag's transmission, and through triangulation that is based on the information derived from the strengths of the received signal, or from time-of-flight information (i.e., differences in time of arrival) the tag's location is approximated. Since the absolute strength of the tag's transmission is not known, the triangulation must operate on the relative transmitted powers, and the resultant triangulation calculations are quite difficult, requiring numerical methods to obtain a solution.

U.S. Pat. No. 7,061,428 discloses a method for estimating the distance of the tag from the base station, but this method cannot tell from which direction the signal came. With distances known, the location's calculation is much simpler, but still complex.

Thus, base stations that are located in rooms of a building, such as a hospital, are unable to identify whether a received signal is from a tag that is in the same room, or in an adjacent room on the same floor, or on a floor above or below the base station without extensive processing. The difficulty stems from the fact that neither the base stations nor the tags employ directional antennas and, at least in the U.S., many buildings are constructed with walls that are made of materials that are substantially transparent to RF radiation.

Some artisans tried to solve the localization problem using IR technology, but IR has its own significant shortcomings; the major one being that it performs poorly without a clear line of sight between the tag and the base station. As a result, tags sometime use both IR and RF technologies to try and solve the problem, but this "fusion" technology does not work much better, since once the IR signals are not received by the base station, one is left with the aforementioned problem of RFID tags.

SUMMARY OF THE INVENTION

An advance in the art is achieved with a base station that uses an antenna assembly and associated signal processing that result in a clear determination that a received signal of a tag arrives from one of two sets of directions. A system for localizing tags in a building is realized by employing a number of such base stations that are judicially positioned within the building, and their signals are collected and compared in order to localize tags that are detected by the base stations.

A base station in accord with the principles disclosed herein illustratively comprises an antenna assembly that provides two output signals, with one signal corresponding to the strength of signal received from substantially a first set of directions, and the other signal corresponding to the strength of signal received from substantially another set of directions. Advantageously, each of the two sets of directions is sensitive to signals from approximately 180 degrees (i.e., covering a hemisphere) and the first set of directions is disjoint from, or does not overlap, the second set of directions. For example, the antenna assembly may comprise two separate directional antennas, each being sensitive to signals from a set of directions, that are spatially positioned relative to each other so that the logical intersection of the two sets of directions is substantially null (i.e., they don't overlap).

In one embodiment, each of the antennas is a patch antenna, comprising a first conductive plane section forming a ground plane, and a second, conductive plane section that is of smaller area than the ground plane and spaced apart therefrom. When the two antennas are positioned relative to each other so that their ground planes are parallel to each other, then the two ground planes may be merged into a single ground plane to form an antenna assembly that is easier and less costly to construct.

In an alternate embodiment, the system is enhanced by augmenting it with the frequency hopping technique disclosed in the aforementioned patent.

DETAILED DESCRIPTION

One objective herein is to impart the ability to localize a detected tag; i.e., a tag whose transmissions are detected by the base stations. A more specific objective herein is to impart the ability to operate in an environment where a detected tag is in one of a number of pre-specified locations (volumes), such as rooms, and to identify the room in which the detected tag is located.

One important aspect of the principles disclosed herein is the use of directional antennas. A directional antenna is an antenna with a high sensitivity to signals arriving from angles (directions) that collectively form a solid angle, and low sensitivity to signals arriving from all other angles. It is not necessary for this directional antenna to have equally high sensitivity throughout the sensitive solid angle and, actually, it is probably not realizable. In fact, antennas typically have a single angle at which the antenna is most sensitive, and it can be said that the antenna is directed at that direction. The sensitivity at angles away from the most sensitive direction typically first drops slowly, and then precipitously, thereby forming a primary lobe. At some other angles, other lobes are typically formed that are of much lower peak sensitivity.

One way to delimit the size of the solid angle of the main lobe is by the peak sensitivities of the other lobes. Choosing the one lobe of the other lobes with the highest peak sensitivity as the floor level (or the high water mark level), the main lobe is defined as the solid angle that includes the direction of peak sensitivity and all other contiguous angles (directions) where the sensitivity is not less than the floor level. Good antenna designs have a floor level that is significantly lower than the maximum sensitivity in the sensitive solid angle; for example not less than the 10 db lower. Also, in many of the applications where locations of tags are sought to be identified it is advantageous for the main lobe to approach 180 degrees (a hemisphere).

Figure 1:
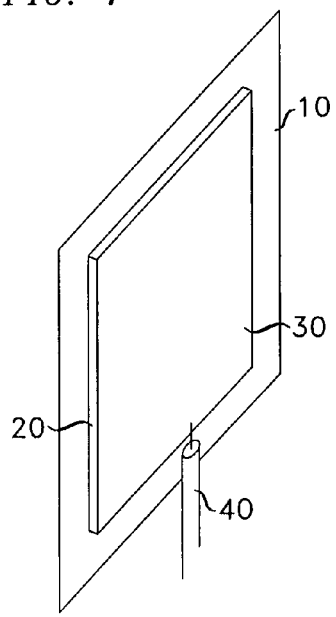
FIG. 1 shows a patch antenna.

One design for a directional antenna is presented in FIG. 1. It comprises a rectangular ground plane section 10, a spacer 20, and an active plane 30 that is also a rectangular plane section, but its area is smaller than the area of the ground plane. Spacer 20 enforces a uniform separation of plane 30 from plane 10. Coax feed 40 has its shield physically and electrically connected to ground plane 10 and it center conductor to active plane 30. This antenna is sometimes referred to as a patch antenna. Typically, the active plane is square, and somewhere between, ¼ and ½ wavelength to a side. The ground plane is slightly larger than the active plane, which helps control the back-to-front transmission ration. Spacing 10 is made of some non-conductive material (e.g., plastic) and is approximately $1/20^{th}$ of the wavelength.

Figure 2:
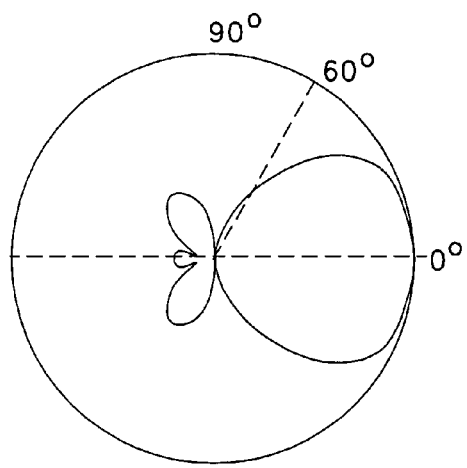
FIG. 2 shows the sensitivity pattern of the FIG. 1 antenna.

FIG. 2 depicts the general antenna pattern of the FIG. 1 antenna where, by convention the direction of greatest sensitivity is at 0 degrees. The high water mark is at point 5, which is 10 db lower than the sensitivity at 0 degrees, and that results in the main lobe spanning between −60 and −60 degrees. It may be noted in connection with the antenna design shown in FIG. 1 that the reception at other than the main lobe (typically referred to as the side and back lobes) can be controlled and reduced using a larger ground plane section 10 and better insulating material 30. In other words, the size of the solid angle of the main lobe and (more importantly) the difference between the maximum sensitivity and the high water mark of the side lobes depend on the precise antenna design and implementation.

Because of the antenna design, a transmitting tag that happens to transmit from a direction that is subsumed by the main lobe will deliver more power to coax 40 than a tag that transmits from a direction that is not subsumed by the main lobe, but determining the direction of the tag solely based on received power cannot be done without more information. In accord with the principles disclosed herein at least two different antenna signals are employed, and information about the tag's location is ascertained from the at least two antenna signals.

More specifically, the antenna arrangement of this invention provides a first signal that corresponds to the power received by a first lobe of the antenna arrangement and a second signal that corresponds to the power received by a second lobe of the antenna arrangement. It is best if the two lobes don't overlap, but overlapping lobes do not destroy the operational viability of the arrangement.

Figure 3:
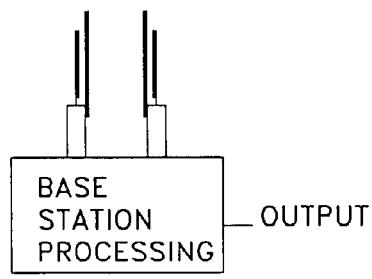
FIG. 3 shows a base station that employs two patch antennas.

FIG. 3 depicts a system with one such antenna arrangement, comprising antenna 60 that is directed to the right and antenna 70 that is directed to the left; both of which are of a design shown in FIG. 1. The signals of antennas 60 and 70 are applied to processor 80 where the power of the antenna 60 signal is subtracted from the power of the antenna 70 signal. A positive result indicates that the signal emanates from the right, while a negative result indicates that the signal emanates from the left.

An important aspect of the FIG. 3 arrangement is that the two antennas are as close to each other as the antenna design permits because it is highly advantageous for the two antennas to be subjected to the same, or substantially the same, signals. One design where the two antennas are particularly close to each other physically is shown in FIG. 4, where the two directional antennas point to diametrically opposite sides and share one ground plane section.

Figure 4:
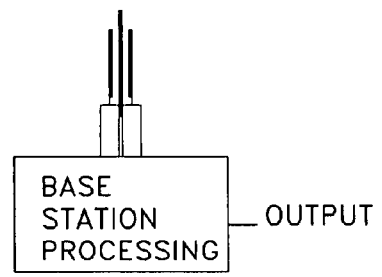
FIG. 4 shows a base station with two patch antennas that share a common ground plane section.

While the arrangements shown in FIGS. 3 and 4 delineate the location of a transmitting tag in the sense that they tell whether the tag is to the right or to the left (as depicted) of the base station, that may not be sufficient for applications where it is desirable to know the location of a transmitting tag with greater specificity. To that end, in accord with the principles disclosed herein a number of base stations are employed, and a decision as to the location of a transmitting tag is made on the basis of decisions made by the number of the base stations; in other words, by triangulation.

Figure 5:
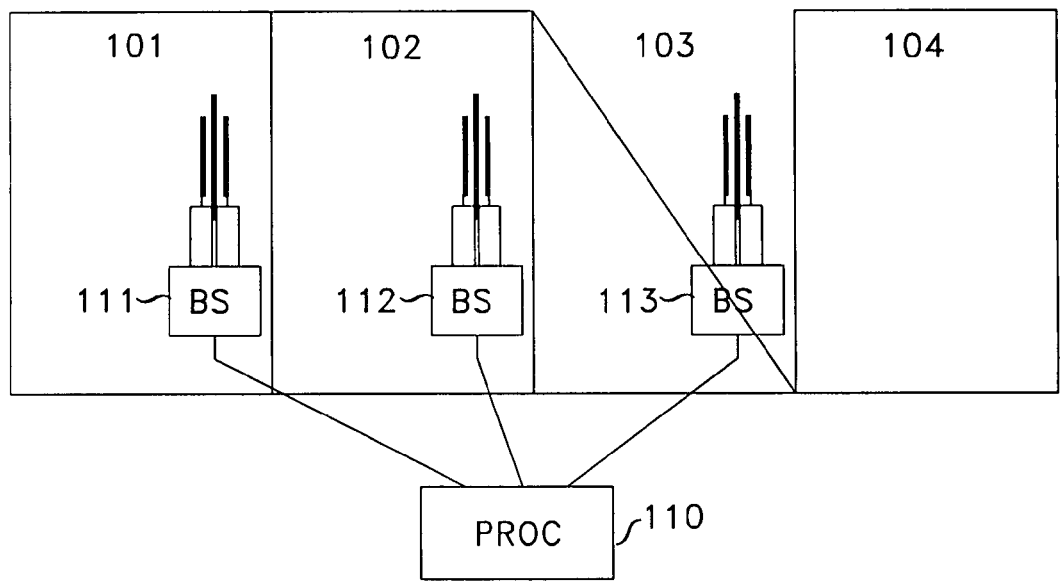
FIG. 5 a system that employs a number of base stations.

To illustrate, FIG. 5 presents a system in a building with rooms 101, 102, 103, and 104. Employing base stations with an antenna arrangement as disclosed in FIG. 3, the FIG. 5 system includes a base station close to the right wall of each of the rooms 101, 102, and 103, to wit, base stations 111, 112, and 113. Under the assumption that a tag is in one of the rooms, the following conditions can exist:

| Location of tag | Decision by 111 | Decision by 112 | Decision by 113 |
|---|---|---|---|
| Room 101 | left | left | left |
| Room 102 | right | left | left |
| Room 103 | right | right | left |
| Room 104 | right | right | right |

While the above might correspond to a system that requires the least number of base stations, it might be that minimizing the number of base stations is not imperative, and more base stations may be used; for example, to exclude tags that are outside the described set of rooms, or to remove ambiguities due to a combination of tag location and solid angle coverage of the antennas' main lobe.

To identify the room in which a transmitting tag is located the logical processing that is impliedly embodied in the above table must be carried out. To do so, the FIG. 5 system includes processor 110 that communicates with the base stations and carries out the logic of the above table to thereby arrive at the conclusion as to the location of the tag.

Figure 6:
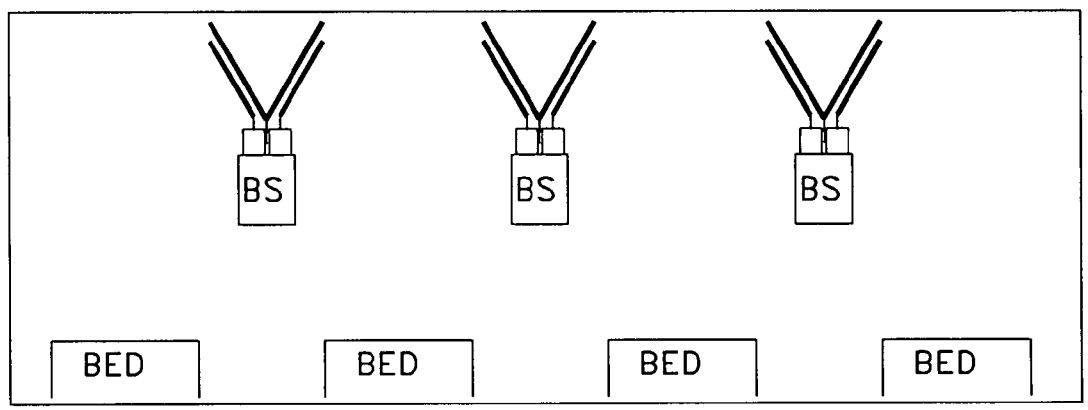
FIG. 6 a system that employs a number of base stations where the two antennas of a base stations point at directions that are 120 degrees apart, in contrast to the 180 degrees apart in the FIG. 5 system.

FIG. 6 depicts a system in, for example, a pre-operations room with four beds on which tagged patients may be lying. Again, three base stations are used, placed above the beds and roughly in the border line between the cubicles. Illustratively, these base stations employ an antenna arrangement that employs two antennas that don't have their lobes directed at diametrically opposite directions. Rather the antennas are at complementary 30 degree angles relative to the vertical and at 60 degrees relative to each other. This difference notwithstanding, the principle of operation is the same as in the FIG. 5 system. That is, by comparing the power incident on each of the two antennas, a decision is made as to whether a received tag signal is in the direction of one of the antennas, or the other.

A practical embodiment of, for example, the FIG. 5 system of multiple base stations and multiple tags, can be either synchronous or asynchronous. In a synchronous embodiment, the base stations are synchronized to each other and, illustratively, time is divided into frames of time slots. Tags synchronize themselves to the frame, during a preselected time slot they obtain a time slot assignment (using a contention protocol) and thereafter transmit on the assigned time slot. In an asynchronous embodiment tags employ a contention protocol throughout. Both synchronous and asynchronous operation of a system having a plurality of base stations and a plurality of tags are well known in the art.

Signal reception problems (fading) as well as errors in determining the direction from which the tag transmit can arise from multi-paths. Fading issues can be minimized using, for example, tags that have two transmitting antennas that are somewhat spaced apart from each other, with the different tag antennas being used alternately. The spatial diversity is highly likely to eliminate fading concerns. As for multi-path issues, they are inherently minimal because the determination as to direction is based on a simple comparison of power received by two (in the FIGS. 5 and 6 embodiments) directional antennas that are occupy substantially the same space and therefore are subjected to substantially the same signals. Multi-path problems also can be mitigated, for example by using the technique disclosed in the aforementioned U.S. Pat. No. 7,061,428.

It should be realized that use of two antennas in the base station is merely illustrative of the principles of this invention, and that the kernel pertains to the ability to discern direction with a simple comparison operation between the power of the signal received by at least two separate antennas that are physically substantially in the same space and have different directional characteristics, coupled possibly with triangulation. Thus, for example, although the above example employs two directional antennas that are physically arranged to have their main lobes be substantially disjoint, one can also have an embodiment where only one of the antennas is directional, or an embodiment with more than two directional antennas.

The invention claimed is:

1. A system comprising:
   at least one base station that includes
      a first receiving module that includes a first antenna, said first antenna being characterized by a main lobe that encompasses a first solid angle, where sensitivity of said first antenna to signals arriving at an angle which said first solid angle subsumes is greater than signals arriving at any other angle, and is greatest at a first direction;
      a second receiving module that includes a second antenna; and
      a processing module processes the signal received by said first antenna and the signal received by said second antenna to develop output information;
      where the second antenna is arranged to be subjected to essentially the same signals to which the first antenna is subjected.

2. The system of claim 1 where said output information identifies one or another of two directions.

3. The system of claim 2 where said processing by said processing module compares power of signal received by said first antenna to power of signal received by said second antenna to arrive as said output information.

4. The system of claim 1 where said information contains a measure of power of signal received by said first antenna and a measure of power of signal received by said second antenna.

5. The system of claim 1 where the first antenna and the second antenna are apart from each other forming a spatially diverse antenna assembly.

6. The system of claim 1 where
   said second antenna is characterized by a main lobe that encompasses a second solid angle, where sensitivity of said second antenna to signals arriving at an angle that is part of said second solid angle is greater than to signals arriving at any other angle, and is greatest at a second direction; and
   said second antenna is arranged with the second direction being different from the first direction.

7. The system of claim 6 where the second direction is set to have said first solid angle that is essentially disjoint from said second solid angle.

8. The system of claim 1 where said first antenna is a patch antenna.

9. The system of claim 1 where said first antenna and said second antenna are each a patch antenna.

10. The system of claim 1 where said first antenna and said second antenna are formed from a first plane section, a second plane section, and a third plane section therebetween, with (a) all of the plane sections being essentially parallel to each other, (b) the third plane section forming a ground plane of both the first and the second antennas, and (c) the first and second plane sections forming an active plane of said first and second antennas, respectively.

11. The system of claim 1 where said first solid angle is greater than 120 degrees.

12. The system of claim 1 where said first module and said second module are adapted to receive signals transmitted by an RFID, and said processing module makes a determination as to whether a signal received from said RFID is more likely than not from a direction that corresponds to said first solid angle.

13. The system of claim 12 that includes not less than two of said base stations, each of which develops output information, and further comprises a processor for combining said output information of said at least two base stations to arrive at a conclusion regarding location of said RFID.

14. The system of claim 13 where each of said base stations contributes one or more signals to said processor for each conclusion by said processor.

15. The system of claim 13 where at least one of said at least two base stations are situated in most rooms of an establishment having a plurality of rooms.

16. The system of claim 12 where said RFID tag comprises at least two, spatially separated, antennas.

17. The system of claim 12 where said RFID employs frequency hopping in its transmissions, and said at least two base stations are adapted to receive signals from said RFID.

* * * * *